Feb. 9, 1954
G. G. MALLY
2,668,510
DEVICE FOR COOLING BONDED TUBING
Filed Jan. 24, 1949
3 Sheets-Sheet 1
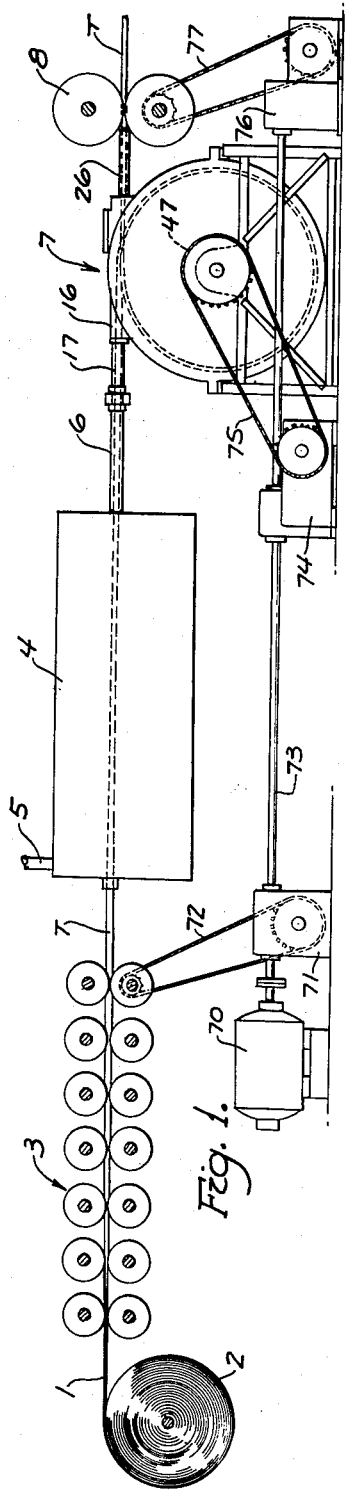
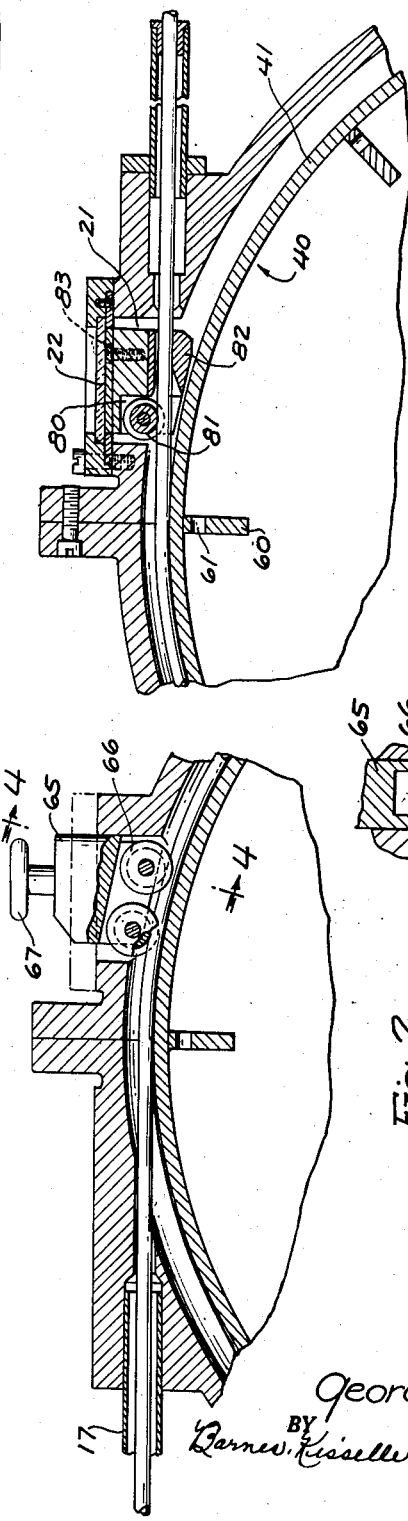
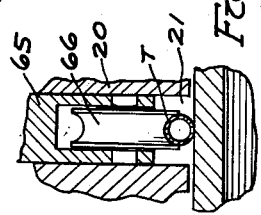
Fig. 1.
Fig. 2.
Fig. 3.
Fig. 4.
INVENTOR.
George G. Mally
BY
Barnes, Kisselle, Laughlin & Raisch
ATTORNEYS.

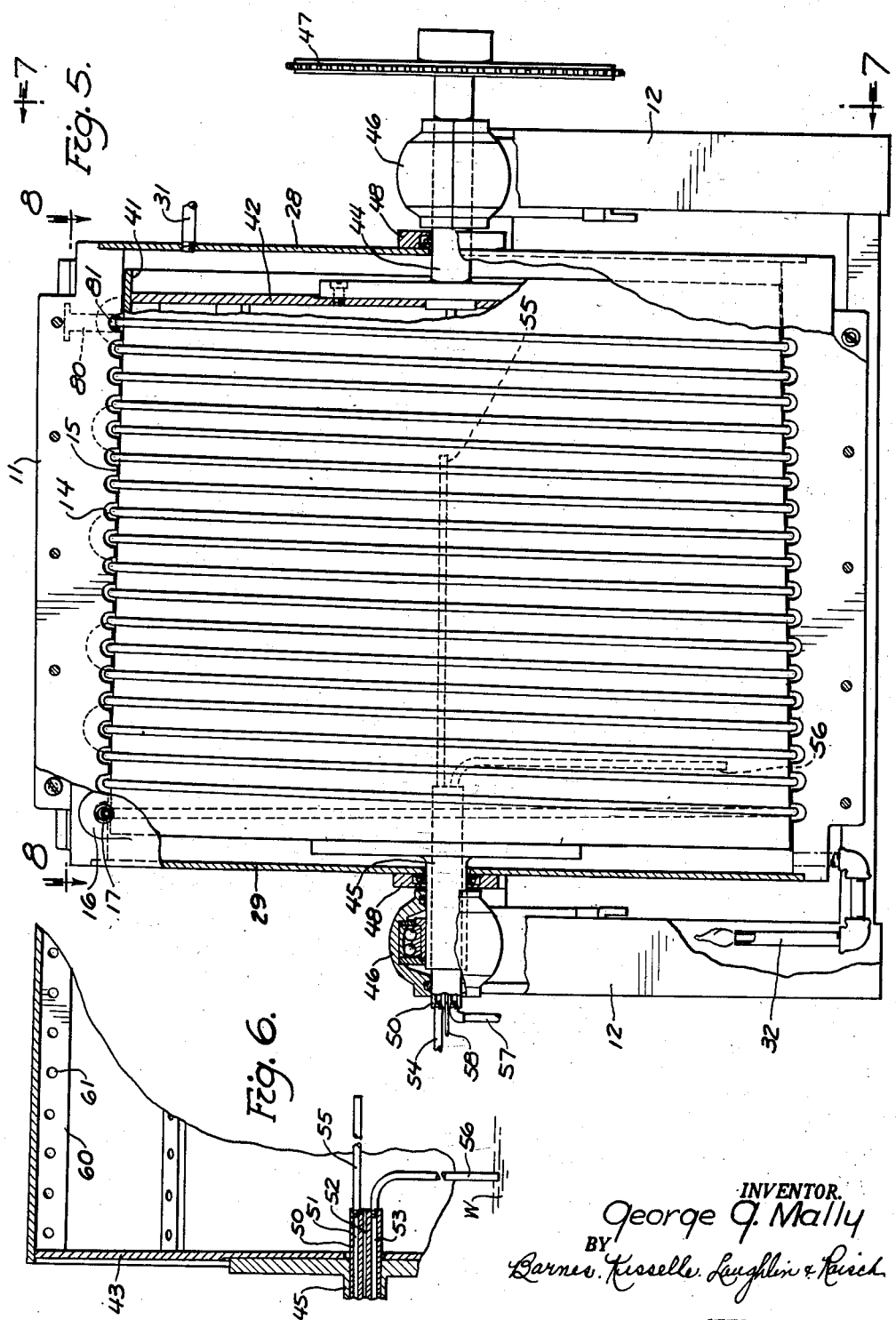

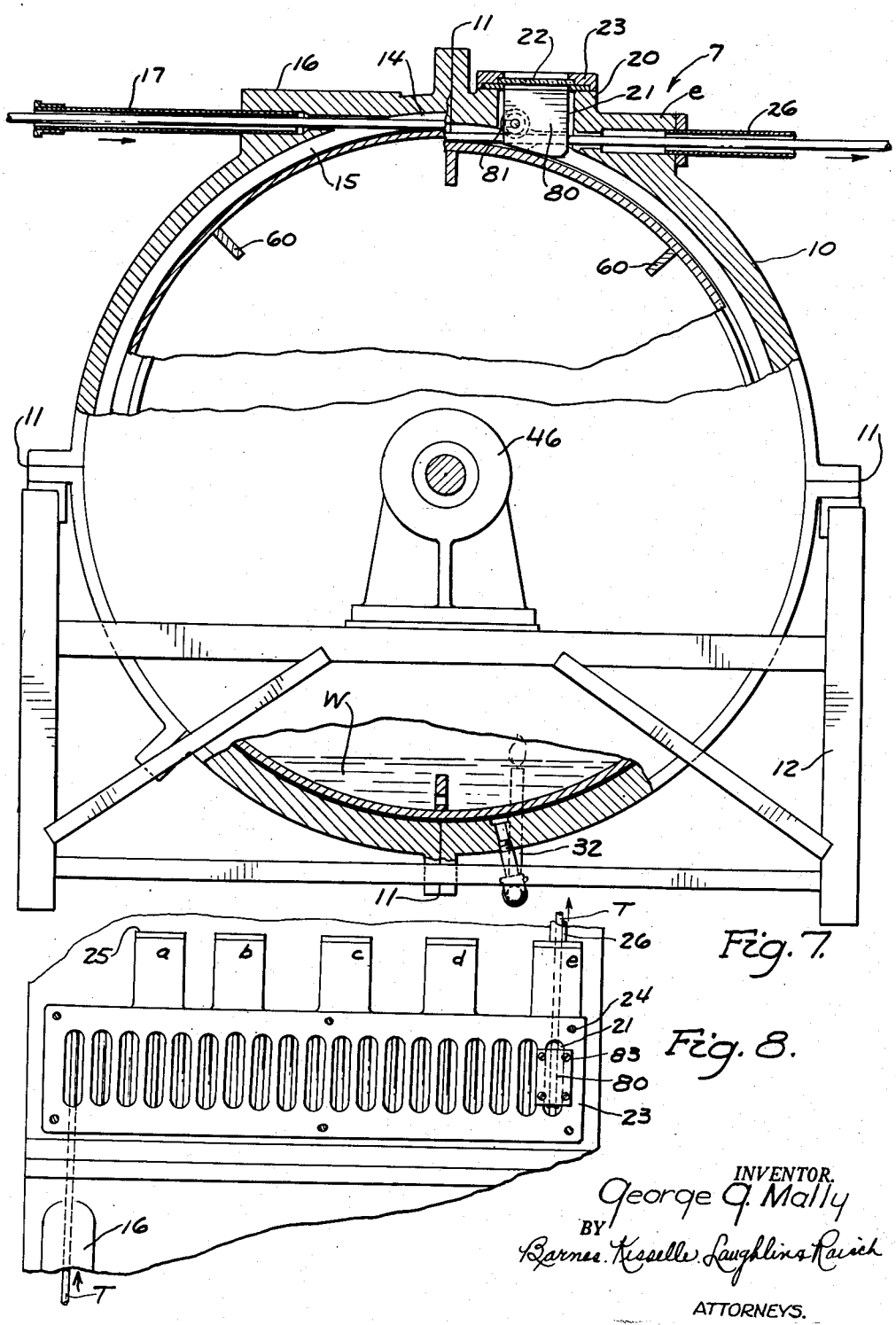

Patented Feb. 9, 1954

2,668,510

UNITED STATES PATENT OFFICE 2,668,510

DEVICE FOR COOLING BONDED TUBING

George G. Mally, Detroit, Mich., assignor to Bundy Tubing Company, Detroit, Mich., a corporation of Michigan Application January 24, 1949, Serial No. 72,388

5 Claims. (Cl. 113—98)

This invention has to do with the manufacture of tubing and it relates particularly to the manufacture of tubing from strip metal stock.

In such manufacture of tubing, the strip stock is usually in the form of a roll and the stock is drawn from the roll with longitudinal movement and is passed through a tube mill which fashions the strip into hollow cross sectional form. The hollow cross sectional form is then passed through a welding or brazing zone for heating the form so that the seams or plies thereof may be united. The actual uniting of the seams or plies may occur upon a slight cooling of the stock from the maximum temperature attained in the welding or brazing means, and this may take place as the stock leaves the welding or brazing zone. These steps are carried out with substantially uniform and continuous longitudinal movement of the tube. After the strip is welded or brazed it is in a heated condition and must be cooled with sufficient slowness to obtain the desired metal characteristics. This is particularly true where the strip stock is steel and where the stock has been heated sufficiently for a copper braze.

Where tubing is thus manufactured at what may be considered a high rate of speed, the same moves through any cooling device at the same rate of speed as the tube made, and in order to properly cool the tubing, the cooler must accommodate an adequate length of the stock. In fact, one of the major difficulties encountered in the making of tubing at a high rate of speed, is the provision of an adequately long cooler and, further, is the difficulty of having a plant or building which is long enough to house a cooler of required length.

One object of the present invention is to provide a cooler system so constructed and arranged as to concentrate a relatively great length of tubing in a space or area which is relatively small measured lineally, and to cool the tubing while it is so concentrated. In accordance with the invention the longitudinally moving tubing moves into the zone of tubing concentration with continuous movement and is drawn from the zone with like movement. More specifically, the tubing is concentrated in the form of a coil. The invention aims to provide a cooler in which a relatively great length of tubing is concentrated with the cooler arranged to accommodate or provide for the shortening of the tubing incident to contraction of the metal as it is cooled, and to maintain the tubing in a controlled atmosphere while it is in the zone of concentration. The invention, furthermore, aims to provide a method of making tubing where the strip and tubing move longitudinally with substantially continuous movement and wherein the tubing maintains such movement in the zone of concentration so that the cooled tube may be drawn from the zone of concentration with longitudinal movement corresponding to the longitudinal movement of the tubing at the point of entry into the zone of concentration.

One form of apparatus for carrying out the invention is disclosed in the accompanying drawings:

Fig. 1 is a somewhat digrammatic view of an apparatus for making tubing in accordance with the invention, showing the tube mill, the welding or brazing furnace and the cooler.

Fig. 2 is an enlarged cross sectional view taken through a portion of the cooler illustrating the tubing at the entrance to the cooler.

Fig. 3 is a sectional view similar to Fig. 2 showing the tubing at an exit of the cooler.

Fig. 4 is a sectional view taken on line 4—4 of Fig. 2 illustrating a device which may be used in threading the tubing through the cooler.

Fig. 5 is a cross sectional view of the cooler showing the drum thereof in elevation but with some parts of the drum broken away and some in section.

Fig. 6 is a broken view, partly in section, of the drum, showing the arrangement for the entrance and exit of cooling fluid.

Fig. 7 is a view of the cooler looking in the direction of the arrows 7—7 of Fig. 5 with some parts cut away and some in section showing the drum and housing structure.

Fig. 8 is a plan view of a portion of the top of the drum looking in the direction of the arrows 8—8 of Fig. 5 and illustrating the entrance and several outlets for the tubing.

As illustrated in Fig. 1 the strip stock 1 may be drawn from a supply roll 2 and passed through a tube mill having suitable forming rollers 3 so that the stock is fashioned into tube as illustrated at T. The tubing may then pass through a suitable welder diagrammatically illustrated at 4. The welder may be one for butt welding the edges of the strip together wherein the entire body of the tubing is heated substantially to welding temperature, or it may be a furnace for raising the temperature to a point so that interfacial portions of the tubing may be copperbrazed together. A non-oxidizing or reducing atmosphere may be introduced in to the furnace through a pipe 5. The particular form of welder or brazer may vary but the cooler of the present invention may be most useful with a welder or furnace which heats the entire tubing. From the welder or brazing zone 4, the tubing may pass through a guide pipe 6 and into the cooler generally indicated at 7 wherein a long length of the tubing is concentrated and cooled, and the tubing, after being cooled, may leave the cooler and it may be pulled by pulling rolls 8.

As indicated in Fig. 7, the cooler comprises an exterior housing 10 conveniently made of four segments with the segments attached to each other as at the several joints 11. The housing is stationary and is supported by a suitable base or supporting structure, generally indicated at 12.

The housing is preferably formed of cast metal, such as cast steel or cast iron, and provided with a wall of adequate thickness. The interior surface of the housing is provided with a helical groove as indicated at 14 (Fig. 5) with the convolutions of the groove spaced apart as indicated and separated by a helical wall or baffle 15. At the entrance end, the housing is provided with a boss 16 which may receive a guide tube 17 for attachment to the guide tube 6 (Fig. 1).

Extending transversely across the top of the drum is a portion 20 which has a plurality of apertures 21 therein with each aperture in alignment with a convolution of the groove 14. The apertures may be closed by means of a transparent element, such as a piece of heat resisting glass 22, held in place by a frame member 23, which may be bolted to the part 20 as by means of bolts 24 (Fig. 8). Thus, as will be appreciated by reference to Fig. 8, the tubing is visible through the apertures. Leading from the portion 20, are a plurality of outlets indicated at $a$, $b$, $c$, $d$, and $e$ (Fig. 8), which selectively may be closed by caps 25 or provided with an outlet guide tube 26, the purpose of which will presently appear.

The housing is closed at its opposite ends by closure plates 28 and 29 so that a substantially gastight structure is provided and in the operation of the apparatus, a suitable gas may be caused to flow into the housing through an inlet pipe 31 and this gas may burn off from a discharge pipe 32 which may connect into the bottom of the housing as shown in Fig. 5. This gas may be suitable non-oxidizing or reducing gas.

Mounted in the housing is a drum generally indicated at 40. This drum is circular in cross section and the outer wall 41 is tapered from one end to the other so that the drum is in the form of a frustum of a cone. The drum has a nice running clearance with the interior surfaces of the housing, which surfaces are likewise tapered or of frusto-conical shape, as shown in Fig. 5. The grooves 14 accordingly, provide clearance spaces with respect to the drum while the intervening partition or walls 15 have their surfaces in close proximity to the drum so that each clearance space is substantially closed from the adjoining clearance spaces. The drum is closed by end walls 42 and 43 to provide a fluid-tight enclosure and the end walls are provided with trunnions or pintles 44 and 45 which project through the end walls 28 and 29 of the housing. These trunnions are rotatably supported in bearings 46 which are carried by the support 12. One trunnion is provided with suitable means, such as sprocket 47, by means of which the drum may be rotated. Suitable sealing elements 48 are disposed at the running joint between the trunnions and walls 28 and 29 of the housing to prevent escape of the gas which enters the housing.

A cooling fluid, such as water, is supplied into the drum and, for this purpose, the trunnion 45 is hollow (Fig. 6) and passing therethrough is a conduit element 50 shown in Fig. 6 as having three passages 51, 52 and 53 therein. The cooling water may be supplied through a pipe 54 connected to the element 50 so that the water flows through the passage 51 and thence into a pipe 55 which may project into the drum as shown in Fig. 5. The water is caused to flow into and out of the drum and for this purpose, there is an outlet tube 56 which may be flexible and is connected to the passage 53 of the element 50 and which has its inner end extending downwardly to terminate a suitable distance above the lower portion of the drum. Water passing out of the drum flows through the passage 53 and through a discharge pipe 57. Air under pressure may be introduced into the drum through a pipe 58 which connects into the passage 52 of the element 50.

The interior of the drum is preferably provided with a series of baffles 60 which extend lengthwise of the drum preferably from one end wall to the other and which project inwardly from the outer wall 41. As the drum is rotated these baffles pass through the water which accumulates in the bottom of the drum, as shown at W, in Fig. 7. The baffles agitate the water and they are preferably provided with apertures 61 so as to allow some of the water to pass therethrough.

The cooling fluid or water may be maintained in the drum up to the level of the inlet of the tube 56. This may vary within some limits as the drum rotates and agitates the water. The drum is fluid-tight and air is trapped in the drum above the level of the water. Air introduced under suitable pressure into the drum through the tube 58 causes the water to discharge upwardly through the depending end of the tube 56. This pressure will serve to elevate the water for its discharge but after the flow of water has commenced the flow may continue by siphonic action. On the other hand, it may be unnecessary, under some conditions, to introduce air as the pressure of the water as introduced through the pipe 55 may suffice. In any event, as the drum is rotated, the water is agitated and the drum thereby cooled substantially uniformly.

A straightening device may be used for straightening the tube as it leaves the drum. Such a straightening device may be located in the aperture 21 of the selected outlet. This straightening device has a body 80 which fits in any one of the apertures 21 and which may be held in position by the cover 23 as shown in Figs. 3 and 7. The body carries a free running straightening roll 81 and an adjustable guide bushing 82. The tubing travels under the roll and over the underlying surface of the guide drum so that the tube is bent back relative to the curvature which the drum may tend to put therein. The guide bushing may be adjusted by an adjusting screw 83 to thereby obtain the desired straightening action.

In initially threading the tubing through the cooler, the frame member 23 with the transparent plate 22 may be removed to thereby expose the drum to view and a small dolly, as illustrated in Figs. 2 and 4, may be used. This dolly comprises a body 65 which is insertable through any one of the passages or apertures 21 as shown in Fig. 2 and it has rollers 66 for engaging the tubing. The dolly may be pushed against the tubing by hand through the means of a handle 67. As the tubing enters the drum, the operator may push the dolly downwardly to cause the tubing to frictionally engage the drum so that it moves uniformly with rotation of the drum. Of course, after the tubing is properly threaded through the drum the dolly is removed and the closure piece 22 and 23 replaced.

As the tubing is threaded into the cooler, the leading end passes from the guide tube 17 into the entrance end of the helical groove 14 and as the drum revolves the leading end follows the groove 14 helically so that the tubing is wound upon the drum helically. As shown in Figs. 5 and 8, the tubing may be caused to move from the drum through one of several of the outlets $a$, $b$, $c$, $d$ and $e$. If the full capacity of the drum is desired the tubing is caused to pass out through the outlet $e$. For varying lesser cooling requirements, any one of the other outlets may be selected. Such selection depends upon the temperature of the tube entering the cooler, the temperature desired as the tubing leaves the cooler, the speed of movement of the tubing, the mass of metal in the tubing as well as other factors.

After the tubing is threaded through the cooler, and the machine is in operation, the drum is operated in substantial unison with the operation of the tube mill and the pulling rollers 8 although the pulling rollers may have a slight excess speed to maintain tension of the tubing. As diagrammatically representative of driving means, there is illustrated in Fig. 1 a motor 70 which through a gear reducer 71 drives a tube mill through a chain 72. Extending from the reducer is a shaft 73 which drives an adjustable variable speed unit 74. From the variable speed unit, a chain 75 extends over the sprocket 47 on the drum to drive the same. The shaft 73 continues to another adjustable variable speed unit 75 from which unit extends a chain 76 for driving the final pulling rolls 8. It will be understood that all or a suitable number of the rolls of the tube mill may be driven for which purpose they may be interconnected by driving means (not shown). The non-oxidizing or reducing gas enters and flows through the housing to thus maintain the tubing in a desired atmosphere and the cooling water is passed through the drum as above described. It will accordingly be seen that a long length of tubing is concentrated into a compact form and specifically in a form of a helix wound upon the drum. Each convolution of tube is separated from adjacent convolutions by the groove formation in the housing and thus interradiation between the convolutions is substantially prevented. The factor of friction is reduced materially over what would otherwise be the case with the tubing in straight form. This is true because the drum is driven with the result that there may be practically no friction involved although there may be some side thrust on the sides of the grooves. The taper of the drum and housing is to accommodate for the contraction of the tubing as it cools. It is appreciated that a straight taper, such as the one shown herein, does not correspond exactly with a curve representing the shortening of the tubing due to cooling, but a compromise is thought to be preferred in the sense of providing a straight taper which, for its overall length, approximates the overall curve of contraction of the tubing.

I claim:

1. A device for cooling tubing which has been fashioned from longitudinally moving strip metal stock and which has been heated for the uniting of seams or plies thereof, comprising, a housing, a drum within the housing having a single thickness peripheral wall upon which the tube may be wound, means for rotating the drum, said housing having an inlet for the tubing and having an outlet for the exit of the tubing, the inner peripheral walls of the housing being formed with a helical groove with wall portions between each convolution of the groove positioned relatively close to the periphery of the drum whereby to provide a substantially closed groove formation for the convolutions of the wound tubing, said drum having closed ends and means for causing a cooling fluid to flow through the drum in contact with the inner surfaces of the single thickness peripheral wall.

2. A device for cooling tubing which has been fashioned from longitudinally moving strip metal stock and which has been heated for the uniting of seams or plies thereof, comprising, a housing, a fluid-tight hollow drum in the housing, means for rotating the drum, the interior walls of the housing being formed with a helical groove with a wall portion between the convolutions of the groove which lie in close proximity of the drum, the circumferential surface of the drum being substantially smooth throughout the axial extent of the helical groove in the housing, said housing having an inlet opening for tubing and an outlet opening for the tubing axially removed from the inlet opening, whereby tubing may be helically wound on the drum with the convolutions lying in the helical groove, the interior wall of the housing and the circumferential wall of the drum being of tapered form substantially from one end to the other with the larger diameter located adjacent the entrance end, whereby to accommodate for the contraction of the tubing as it cools and means for flowing a cooling fluid through the drum.

3. A device for cooling tubing which has been fashioned from longitudinally moving strip metal stock and which has been heated for the uniting of seams or plies thereof, comprising, a housing, a hollow fluidtight drum within the housing, said housing having internal walls disposed in close proximity to the circumferential wall of the drum having an internal helical groove, the housing having an inlet opening for the entrance of tubing whereby the same may be wound helically on the drum with the convolutions thereof lying in the convolutions of the groove, said housing having a plurality of outlet openings spaced varying distances axially from the inlet opening and selectively usable, and means for flowing cooling fluid into and out of the drum.

4. A device for cooling tubing which has been fashioned from longitudinally moving strip metal stock and which has been heated for the uniting of seams or plies thereof, comprising, a housing, a hollow fluidtight drum within the housing, said housing having internal walls disposed in close proximity to the circumferential wall of the drum and said internal walls having an internal helical groove, the housing having an inlet opening for the entrance of tubing whereby the same may be wound helically on the drum with the convolutions thereof lying in the convolutions of the groove, said housing having a plurality of outlet openings spaced varying distances axially from the inlet opening and selectively usable, and means for flowing cooling fluid into and out of the drum, the drum and the interior walls of the housing being tapered with the larger diameter located adjacent the inlet opening to accommodate for the contraction of the tubing as it cools.

5. A device for cooling tubing which has been fashioned from longitudinally moving strip metal stock and which has been heated for the uniting of the seams or plies thereof comprising, a housing, a drum within the housing upon which the heated tube is to be wound in a series of convolutions with the convolutions in contact with the peripheral surfaces of the drum, means for rotating the drum, said housing having an inlet opening for the tubing positioned substantially tangentially to the drum, said housing having an outlet opening for the exit of the tubing therefrom and which outlet opening is spaced from the inlet opening axially of the drum, means for causing flow of a cooling fluid into and out of the drum for the cooling of the tubing while it is wound upon the drum within the housing, conduit connections on the housing for introducing a non-oxidizing gas into the housing around the drum and for the removal of the non-oxidizing gas from the housing, the outlet opening being disposed substantially tangentially of the drum, straightening means positioned inwardly of the outlet opening and having means for engaging and straightening the tubing substantially as the tubing moves from a convolution into the tangentially disposed outlet opening.

GEORGE G. MALLY.

References Cited in the file of this patent

UNITED STATES PATENTS

| Number | Name | Date |
|---|---|---|
| 423,445 | Roberts | Mar. 18, 1890 |
| 1,153,177 | Keast | Sept. 7, 1915 |
| 1,489,902 | Segelhorst | Apr. 8, 1924 |
| 1,550,157 | Gilette | Aug. 18, 1925 |
| 1,916,372 | Hepburn | July 4, 1933 |
| 1,977,526 | Piscetta | Oct. 16, 1934 |
| 2,040,343 | Simons | May 12, 1936 |
| 2,092,557 | Quarnstrom | Sept. 7, 1937 |
| 2,211,801 | Thompson | Aug. 20, 1940 |
| 2,217,452 | Peck | Oct. 8, 1940 |
| 2,259,367 | Ely | Oct. 14, 1941 |
| 2,305,387 | Pearson | Dec. 15, 1942 |
| 2,506,942 | Seeburg | May 9, 1950 |

FOREIGN PATENTS

| Number | Country | Date |
|---|---|---|
| 595,364 | Germany | Apr. 13, 1934 |
| 552,126 | Great Britain | Mar. 24, 1943 |